United States Patent [19]
Caron et al.

[11] Patent Number: 5,390,120
[45] Date of Patent: Feb. 14, 1995

[54] METHOD AND APPARATUS FOR DETERMINING A NEED FOR VEHICLE BRAKING SYSTEM MAINTENANCE

[75] Inventors: LaVerne A. Caron, Kalamazoo; Richard J. Youngblood, Battle Creek, both of Mich.

[73] Assignee: Eaton Corporation, Cleveland, Ohio

[21] Appl. No.: 987,134

[22] Filed: Dec. 8, 1992

[51] Int. Cl.$^6$ .............. F16D 66/02; G01D 21/00; G01D 11/00; B60Q 1/00
[52] U.S. Cl. .................. 364/424.04; 364/424.03; 364/426.01
[58] Field of Search ........... 364/426.01, 424.03, 364/424.04, 426.02, 426.03; 180/197; 303/95, 96, 97, 103

[56] References Cited

U.S. PATENT DOCUMENTS

| | | | |
|---|---|---|---|
| 4,159,531 | 6/1979 | McGrath | 364/424.04 |
| 4,258,421 | 3/1981 | Juhasz et al. | 364/424 |
| 4,298,857 | 11/1981 | Robins et al. | 340/52 A |
| 4,485,445 | 11/1984 | Braschel | 364/426 |
| 4,533,900 | 8/1985 | Muhlberger et al. | 364/424.03 |
| 4,612,623 | 9/1986 | Bazarnik | 364/424.04 |
| 4,800,991 | 1/1989 | Miller | 188/1.11 |
| 4,817,040 | 3/1989 | Bodley-Scott | 364/424.04 |
| 4,849,894 | 7/1989 | Probst | 364/424.03 |
| 4,873,638 | 10/1989 | Shiraishi et al. | 364/426.01 |
| 4,873,639 | 10/1989 | Sato et al. | 364/426.01 |
| 4,884,054 | 11/1989 | Moon, Sr. | 340/309.15 |
| 4,926,331 | 5/1990 | Windle et al. | 364/424.03 |
| 4,933,852 | 6/1990 | Lemelson | 364/424.04 |
| 5,019,984 | 5/1991 | Masaki et al. | 364/426.02 |
| 5,117,934 | 6/1992 | Tsuyama et al. | 180/197 |
| 5,136,509 | 8/1992 | van Zanten et al. | 364/426.01 |
| 5,140,524 | 8/1992 | Matsuda | 364/426.02 |
| 5,149,177 | 9/1992 | Fujioka et al. | 180/197 |
| 5,159,991 | 11/1992 | Tsuyama et al. | 364/426.01 |
| 5,176,444 | 1/1993 | Kageyama et al. | 303/102 |
| 5,226,509 | 7/1993 | Smith | 188/1.11 |
| 5,263,548 | 11/1993 | Tsuyama et al. | 180/197 |

FOREIGN PATENT DOCUMENTS 2907660  8/1979  Germany .................. 364/424.04

*Primary Examiner*—Kevin J. Teska
*Assistant Examiner*—Stephen J. Walder, Jr.
*Attorney, Agent, or Firm*—Brooks & Kushman

[57] ABSTRACT

Actual performance is used to determine vehicle braking system maintenance requirements. Measures of wheel slip are determined for each wheel of a vehicle during periods of deceleration. The determined measures of wheel slip are accumulated; and those accumulated for left wheels are compared with those accumulated for right wheels of each axially associated set of wheels, those accumulated for one axially associated set of wheels are compared with those accumulated for each of other axially associated sets of wheels, and those accumulated for tractor wheels are compared with those accumulated for trailer wheels. A predetermined difference between measures of wheel slip indicates the existence of a possible problem with the brake associated with the wheel or at least one of the set of wheels for which the least wheel slip is determined.

23 Claims, 2 Drawing Sheets

METHOD AND APPARATUS FOR DETERMINING A NEED FOR VEHICLE BRAKING SYSTEM MAINTENANCE

TECHNICAL FIELD

This invention relates to apparatuses and methods for determining the need for vehicle braking system maintenance.

BACKGROUND ART

This patent application incorporates by reference subject matter contained in the U.S. patent application titled "Method and Apparatus for Estimating Vehicle Braking System Effectiveness," the latter application having application Ser. No. 07/986,797, filed Dec. 8, 1992, now U.S. Pat. No. 5,299,452, having common inventors and assignee, and being filed simultaneously herewith. The subject matter of the referenced patent application is incorporated for reference purposes and is not essential to support the claims or to adequately disclose the invention of the present patent application.

Various systems for determining the need for vehicle braking system maintenance have been used. A common, "bookkeeping" method maintains records of the time elapsed and the number of miles travelled by a vehicle since its braking system has last been serviced so that such service can be performed before braking effectiveness declines to a critical level or to a level that incurs additional problems and/or expenses.

The bookkeeping method offers advantages of being uncomplicated and inexpensive. The conditions under which a vehicle may be driven during periods of similar duration, however, often vary between extremes, for example, heavy versus light traffic, hilly versus flat terrain, high versus low temperature and wet versus dry weather; and such extremes have a substantial affect on the rate and type of brake debilitation experienced. Consequently, the bookkeeping method cannot be expected to be consistently accurate; and disadvantages attending it include, at best, extra physical examinations and prematurely scheduled service and, at worst, service that is scheduled too late.

Brake lining wear does not always proceed at a linear rate, but it does require some time for wear to occur. Certain other parts of the braking system can, however, go from a fully functional condition to a nonfunctional condition very rapidly due to breakage or leakage resulting from the fatigue or damage to critical parts. If a nonfunctional part causes only a portion of the braking system to be nonfunctional or partly so, a driver might not notice the resulting decrease in braking efficiency for some time. During this period, additional damage is invited; and the linings of brakes remaining functional are likely to wear more rapidly than when all brakes are working with the same effectiveness.

The effectiveness of brakes associated with one set of axially associated wheels and the effectiveness of brakes associated with other sets of axially associated wheels must be balanced for optimum braking performance and efficiency. The two most common balance problems are fluid system imbalance and unequal brake torque due to differences in brake lining friction between brakes and to other mechanical problems.

While bookkeeping methods for determining the need for vehicle braking system maintenance function with a certain degree of efficiency, they do not provide the advantages of the improved method and apparatus of the present invention as is hereinafter more fully described.

DISCLOSURE OF THE INVENTION

An object of the present invention is to provide an improved apparatus and method that uses actual vehicle braking performance to accurately determine the need for braking system maintenance so that maintenance is not performed needlessly but is performed as required.

In realizing the aforementioned and other objects, a first embodiment of the apparatus includes means such as an automatic braking system (ABS) control unit for determining measures of wheel slip and generating wheel slip signals representative thereof. A computer is disposed within the automatic braking system control. The computer includes a processor and a memory, and the determined measures of wheel slip are stored in the memory.

The automatic braking system (ABS) control unit provides a normally operable and an automatically operable vehicle braking mode. An example of normally operable braking is braking initiated and controlled solely by a driver and not by the automatic braking system, the action of which includes automatically easing brake pressure when wheel slip exceeds a predetermined amount and increasing it when wheel slip is below a predetermined amount.

A second embodiment of the apparatus includes an output interface that is connected to the automatic braking system control unit to provide external access to the computer and to data stored therein. A third embodiment includes indicating devices that are also connected to the automatic braking system control unit to provide an indication of the existence of possible problems.

The method for accurately determining a need for vehicle braking system maintenance includes determining wheel speed for each wheel and determining vehicle speed. A measure of wheel slip for each vehicle wheel is then calculated from the determined wheel speed and vehicle speed. The calculated measures of wheel slip for each wheel are accumulated in the memory of the computer.

Determined measures of wheel slip accumulated for left wheels are compared with those accumulated for right wheels of each axially associated set of wheels. When brakes are operating properly, the determined measures of wheel slip accumulated for each of axially associated wheels should be substantially the same. A difference that exceeds a predetermined amount indicates the existence of a possible problem with the brake associated with the wheel for which the least determined measure of wheel slip has been accumulated, and the computer generates a brake problem (BP) signal representative thereof.

Determined measures of wheel slip accumulated for one axially associated set of wheels are compared with those accumulated for each of other axially associated sets of wheels. As in the case just described, when brakes are operating properly, the determined measures of wheel slip accumulated for one set of axially associated wheels should be substantially the same as the determined measure of wheel slip accumulated for each of other axially associated sets of wheels. A difference that exceeds a predetermined amount indicates the existence of a possible problem with at least one of the brakes associated with the set of axially related wheels for which the least determined measure of wheel slip has been accumulated, and the computer generates an axial brake problem (ABP) signal representative thereof.

Determined measures of wheel slip accumulated for all wheels on a trailer are compared with those accumulated for all wheels on an associated tractor. As in the two previously described cases, when brakes are operating properly, the determined measure of wheel slip accumulated for wheels on the trailer should be substantially the same as the determined measure of wheel slip accumulated for wheels on the tractor. A difference that exceeds a predetermined amount could indicate the existence of a possible problem with at least one of the brakes associated with the wheels on the tractor or trailer for which the least determined measure of wheel slip has been accumulated, and the computer generates a tractor-trailer brake problem (TTBP) signal representative thereof. It must be kept in mind that such a difference in determined measures of wheel slip could also merely reflect a difference in vehicle load distribution.

In the second embodiment of the apparatus for determining a need for vehicle braking system maintenance, the automatic braking system control unit is also connected to the output interface. The output interface provides external access to the computer and to data stored therein so that periodic vehicle maintenance can include an evaluation of vehicle wheel braking data to determine the need for servicing the braking system.

In the third embodiment of the apparatus for determining a need for vehicle braking system maintenance, the automatic braking system control unit is connected to three indicating devices. Each is actuated in response to the brake problem (BP) signal, to the axial brake problem signal (ABP) or to the tractor-trailer brake problem (TTBP) signal and provides an indication when vehicle braking system maintenance is required.

The object and others of the present invention are readily apparent from the following detailed description of the best mode for carrying out the invention when taken in connection with accompanying drawings.

BRIEF DESCRIPTION OF THE DRAWINGS

A more complete appreciation of the invention and many of the attendant advantages thereof may be readily obtained by reference to the following detailed description when considered with the accompanying drawings in which like reference characters indicate corresponding parts in all the views, wherein.

BEST MODE FOR CARRYING OUT THE INVENTION

Figure 1:
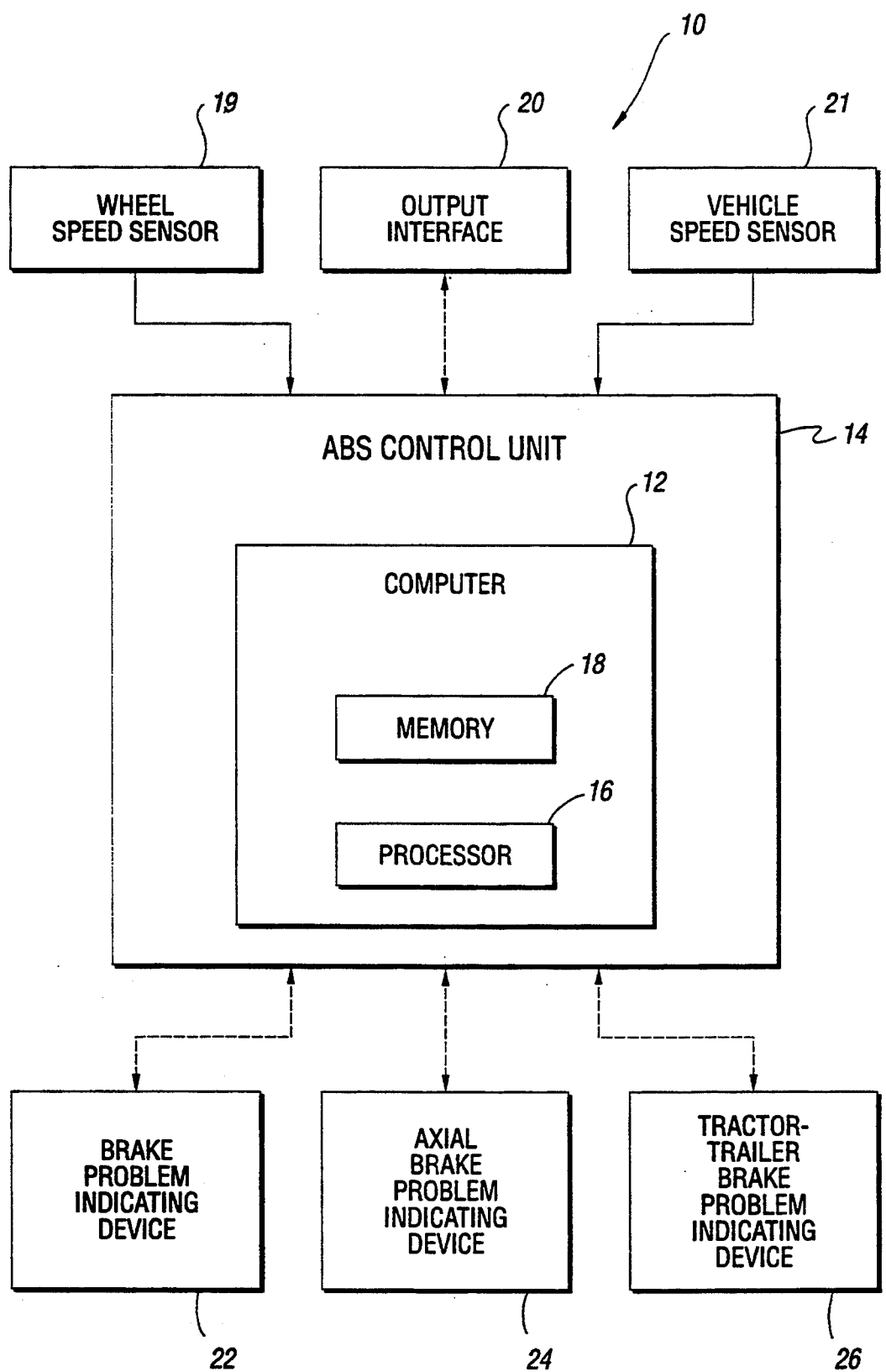
FIG. 1 is a block diagram of the major elements of the present invention.

As shown in FIG. 1, a first embodiment of the apparatus, generally indicated by reference numeral for estimating the effectiveness of vehicle wheel braking includes means, preferably an automatic braking system control unit 14, for determining a measure of wheel slip. The automatic braking system control unit 14 includes a computer 12 having a processor 16 and a memory 18. The apparatus also includes means for determining wheel speed, or a wheel speed sensor 19, for each wheel and means for determining vehicle speed, or a vehicle speed sensor 21.

The automatic braking system (ABS) control unit 14 provides a normally operable and an automatically operable vehicle braking mode. An example of normally operable braking is braking initiated and controlled solely by a driver and not by the automatic braking system, the action of which includes automatically easing brake pressure when wheel slip exceeds a predetermined amount and increasing it when wheel slip is below a predetermined amount.

Wheel slip is related to the difference between wheel speed and vehicle speed. The relationship is generally illustrated by the following equation.

$$S = 1 - \frac{\omega r}{v}$$

where: S-wheel slips
w-heel speed
I-wheel radius
v-hicle speed

It should be noted that the foregoing elements commonly have functions in addition to those associated with the present invention, each of such functions possibly requiring specific interconnections different from or in addition to those shown in FIG. 1.

A second embodiment of the apparatus includes an output interface 20 that is connected to the automatic braking system control unit 14, and a third embodiment includes three indicating devices 22, 24 and 26 that are connected to the automatic braking system control unit 14. The connections between the output interface 20, the indicating devices 22, 24 and 26 and the automatic braking system control unit 14 are shown by dashed lines in FIG. 1.

Figure 2:
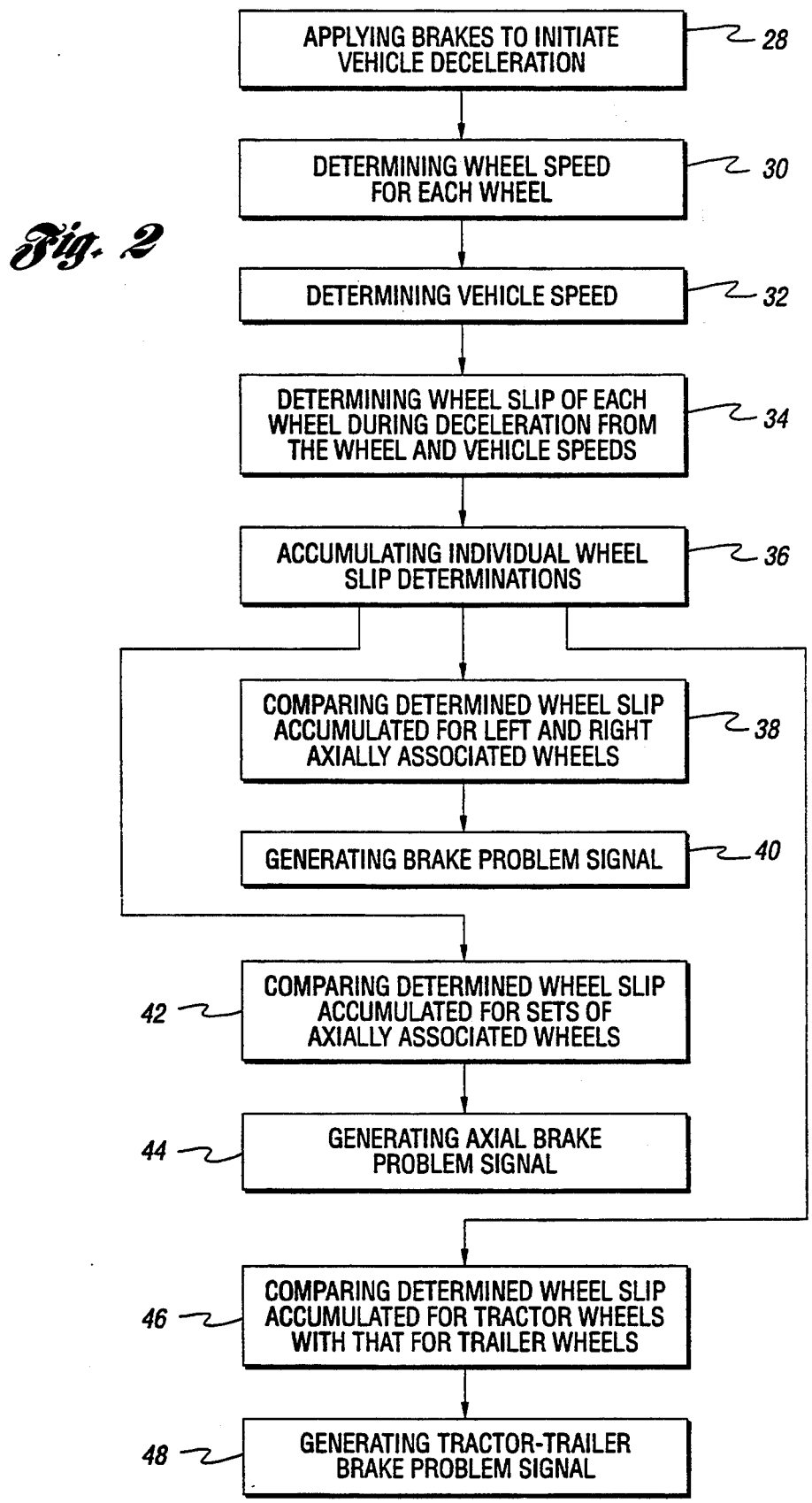
FIG. 2 is a flow diagram illustrating the method of the present invention.

The method for using the apparatus 10 for determining a need for vehicle braking system maintenance is outlined in FIG. 2 and can be understood with reference to both FIG'S. 1 and 2. In operation, a vehicle (not shown) equipped with the apparatus 10 is braked 28 to decelerate the vehicle. Wheel speed is determined 30, and a wheel speed signal is generated, by the wheel speed sensor 19; and vehicle speed is determined 32, and a vehicle speed signal is generated, by the vehicle speed sensor 21. A measure of wheel slip is determined 34 from the data included in the wheel and vehicle speed signals by the automatic braking system (ABS) control unit 14 for each wheel, and a wheel slip signal representative of each determined measure of wheel slip is generated by the ABS control unit 14.

In a properly operating automatic braking system, maximum wheel slip should never exceed fifteen or twenty percent. This is the amount of wheel slip at which the frictional force between a tire and the road is maximum.

The determined measures of wheel slip for each wheel, for this and subsequent vehicle braking operations, are accumulated 36 in the memory 18 of the computer 12. Determined measures of wheel slip accumulated for left wheels are compared 38 by the processor 16 of the computer 12 with those accumulated for right wheels of each axially associated wheel set. The determined measures of wheel slip accumulated for each of axially associated wheels should be substantially the same if brakes are operating properly. A difference that exceeds a predetermined amount indicates the existence of a possible problem with the brake associated with the wheel for which the least determined measure of wheel slip is accumulated, and the computer 12 generates 40 a brake problem (BP) signal representative thereof.

As a practical matter, to segregate substantial differences in determined measures of wheel slip, it is often desirable to accumulate such measures only during significant braking events, for example, only those events where brake treadle pressure exceeds 15 pounds per square inch gauge (psig). If only such events are logged, it may be possible to observe a wheel slip of four percent at one wheel and eight percent at another, which clearly indicates the existence of a problem.

Determined measures of wheel slip accumulated for one axially associated set of wheels are compared 42 by the processor 16 of the computer 12 with those accumulated for each of other axially associated sets of wheels. As in the previously described case, when brakes are operating properly, the determined measures of wheel slip accumulated for one set of axially associated wheels should be substantially the same as the determined measures of wheel slip accumulated for each of other axially associated sets of wheels. A difference that exceeds a predetermined amount indicates the existence of a possible problem with at least one of the brakes associated with the set of axially related wheels for which the least determined measure of wheel slip has been accumulated, and the computer 12 generates 44 an axial brake problem (ABP) signal representative thereof. It should be understood that the step indicated by the reference numeral 42 could be performed prior to the step indicated by the reference numeral 38.

Determined measures of wheel slip accumulated for all wheels on a trailer are compared 46 by the processor 16 of the computer 12 with those accumulated for all wheels on an associated tractor. As in the two previously described cases, when brakes are operating properly, the determined measure of wheel slip accumulated for wheels on the trailer should be substantially the same as the determined measure of wheel slip accumulated for wheels on the tractor. A difference that exceeds a predetermined amount could indicate the existence of a possible problem with at least one of the brakes associated with the wheels on the tractor or trailer for which the least determined measure of wheel slip has been accumulated, and the computer 12 generates 46 a tractor-trailer brake problem (TTBP) signal representative thereof. It should be understood that the step indicated by the reference numeral 46 could be performed prior to either or both of the steps indicated by the reference numerals 38 and 42.

It should also be noted that a difference between a determined measure of wheel slip accumulated for wheels on the trailer and that accumulated for wheels on the tractor could merely reflect a difference in vehicle load distribution. Between left-right, axle-to-axle and tractor-to-trailer wheel slip differences, the left-right differences are the most significant. Most of the actual problems involve misadjusted slacks, defective brakes, oil-soaked linings and the like.

In the second embodiment of the apparatus 10 for determining a need for vehicle braking system maintenance, the automatic braking system control unit 14 is also connected, as indicated by a dashed line in FIG. 1, to the output interface 20. The output interface 20 provides external access to the computer 12 and to data stored in the memory 18 thereof so that periodic vehicle maintenance can include an evaluation of vehicle wheel braking data to determine the need for servicing the braking system.

Wheel slip, vehicle acceleration, brake treadle pressure, and vehicle deceleration are among the data that can also be copied or unloaded for storage elsewhere or used for performance reports, maintenance scheduling, maintenance cost predicting and the like. If authorities would accept the date, it could also be readily provided for use in roadside inspections. The output interface 20 can be any of a number of well-known devices, one of the simplest being a receptacle to which data signals from the computer 12 are communicated and to which an external plug can be mated to communicate the data signals to an external computer or data storage device.

In the third embodiment of the apparatus 10, the automatic braking system control unit 14 is connected, as indicated by dashed lines in FIG. 1, to three indicating devices 22, 24 and 26. The first two of these respectively provide an indication that the vehicle braking system requires maintenance whenever the computer generates a brake problem (BP) signal or an axial brake problem (ABP) signal. The third respectively provides an indication that the vehicle braking system could require maintenance when the computer generates a tractor-trailer brake problem (TTBP) signal. As previously stated, however, the third indication could merely reflect a difference in vehicle load distribution. The indicating devices 22, 24 and 26 can be any of a number of well-known visual or auditory devices.

While the best mode for carrying out the invention has been described in detail, those familiar with the art to which this invention relates will recognize various alternative designs and embodiments for practicing the invention as defined by the following claims.

What is claimed is:

1. Apparatus for determining a need for vehicle braking system maintenance in a wheeled vehicle including fluid-actuated brakes having normally operable and automatically operable braking modes, the apparatus comprising:

means for determining wheel speed and for generating wheel speed signals representative thereof;

means for determining vehicle speed and for generating a vehicle speed signal representative thereof;

calculating means for determining measures of wheel slip for each wheel during periods of vehicle deceleration from data represented by the wheel speed signals and by the vehicle speed signal and for generating wheel slip signals representing the measures of wheel slip determined;

accumulating means for accumulating the measures of wheel slip for each wheel; and comparing means for comparing the accumulated measures of wheel slip and for generating a maintenance signal in response to a predetermined minimum difference therebetween to indicate the existence of a possible braking system problem.

2. The apparatus as defined by claim 1, wherein the calculating means and the comparing means include a computer processor.

3. The apparatus as defined by claim 2, wherein the accumulating means include a computer memory.

4. The apparatus as defined by claim 3, further including an automatic braking system control unit for controlling vehicle deceleration in the automatically operable braking mode, the computer processor and the computer memory being disposed within the automatic braking system control unit and cooperatively functioning therein as a computer.

5. The apparatus as defined by claim 4, wherein the computer includes means for comparing the accumulated measures of wheel slip between left and right wheels of each axially associated set thereof and for generating a brake problem signal in response to a predetermined minimum difference therebetween to indicate the existence of a possible problem with the brake associated with the wheel for which the least determined measure of wheel slip has been accumulated.

6. The apparatus as defined by claim 5, further including a brake problem indicating device connected to the computer and responsive to the brake problem signal.

7. The apparatus as defined by claim 4, wherein the computer includes means for comparing the accumulated measures of wheel slip between one axially associated set of wheels and each of other axially associated sets of wheels and for generating an axial brake problem signal in response to a predetermined minimum difference therebetween to indicate the existence of a possible problem with at least one of the brakes associated with the set of axially associated wheels for which the least determined measure of wheel slip has been accumulated.

8. The apparatus as defined by claim 7, further including an axial brake problem indicating device connected to the computer and responsive to the axial brake problem signal.

9. The apparatus as defined by claim 4, wherein the processor includes means for comparing the accumulated measures of wheel slip between wheels on a tractor and wheels on an associated trailer and for generating a tractor-trailer brake problem signal in response to a predetermined minimum difference therebetween to indicate the existence of a possible problem with at least one of the brakes associated with the wheels on the tractor or trailer for which the least determined measure of wheel slip has been accumulated.

10. The apparatus as defined by claim 9, further including a tractor-trailer brake problem indicating device connected to the computer and responsive to the tractor-trailer brake problem signal.

11. The apparatus as defined by claim 4, further including an output interface connected to the computer for providing external access to the computer and to data accumulated in the memory thereof.

12. A method for determining a need for vehicle braking system maintenance in a wheeled vehicle including fluid-actuated brakes having normally operable and automatically operable braking modes, the method comprising the steps of:
applying the brakes to decelerate the vehicle;
determining the wheel speed of each wheel;
generating wheel speed signals representative thereof;
determining vehicle speed;
generating a vehicle speed signal representative thereof;
determining measures of wheel slip for each wheel during periods of vehicle deceleration from data represented by the wheel speed signals and by the vehicle speed signal;
generating wheel slip signals representing the measures of wheel slip determined;
accumulating the measures of wheel slip for each wheel;
comparing the accumulated measures of wheel slip between left and right wheels of each axially associated set thereof; and
generating a brake problem signal in response to a predetermined minimum difference between the accumulated measures of wheel slip of left and right wheels to indicate the existence of a possible problem with the brake associated with the wheel for which the least determined measure of wheel slip has been accumulated.

13. The method as defined by claim 12, wherein the vehicle includes a brake problem indicating device, the method further including the step of actuating the brake problem indicating device in response to the brake problem signal.

14. The method as defined by claim 12, further including the steps of:
comparing the accumulated measures of wheel slip between one axially associated set of wheels and each of other axially associated sets of wheels; and
generating an axial brake problem signal in response to a predetermined minimum difference between the accumulated measures of wheel slip of axially associated sets of wheels to indicate the existence of a possible problem with at least one of the brakes associated with the set of axially associated wheels for which the least determined measure of wheel slip has been accumulated.

15. The method as defined by claim 14, wherein the vehicle includes an axial brake problem indicating device, the method further including the step of actuating the axial brake problem indicating device in response to the axial brake problem signal.

16. The method as defined by claim 12, further including the steps of:
comparing the accumulated measures of wheel slip between wheels on a tractor and wheels on an associated trailer; and
generating a tractor-trailer brake problem signal in response to a predetermined minimum difference between the accumulated measures of wheel slip between associated tractor and trailer wheels to indicate the existence of a possible problem with at least one of the brakes associated with the wheels on the tractor or trailer for which the least determined measure of wheel slip has been accumulated.

17. The method as defined by claim 16, wherein the vehicle includes a tractor-trailer brake problem indicating device, the method further including the step of actuating the tractor-trailer brake problem indicating device in response to the tractor-trailer brake problem signal.

18. A system for determining a need for vehicle braking system maintenance in a wheeled vehicle including fluid-actuated brakes having normally operable and automatically operable braking modes, the system comprising:
means for applying the brakes to decelerate the vehicle;
means for determining the wheel speed of each wheel;
means for generating wheel speed signals representative thereof;
means for determining vehicle speed;
means for generating a vehicle speed signal representative thereof;
means for determining measures of wheel slip for each wheel during periods of vehicle deceleration from data represented by the wheel speed signals and by the vehicle speed signal;

means for generating wheel slip signals representing the measures of wheel slip determined;

means for accumulating the measures of wheel slip for each wheel;

means for comparing the accumulated measures of wheel slip between left and right wheels of each axially associated set thereof; and means for generating a brake problem signal in response to a predetermined minimum difference between the accumulated measures of wheel slip of left and right wheels to indicate the existence of a possible problem with the brake associated with the wheel for which the least determined measure of wheel slip has been accumulated.

19. The system as defined by claim 18, wherein the vehicle includes a brake problem indicating device, the system further including means for actuating the brake problem indicating device in response to the brake problem signal.

20. The system as defined by claim 18, further including:

means for comparing the accumulated measures of wheel slip between one axially associated set of wheels and each of other axially associated sets of wheels; and means for generating an axial brake problem signal in response to a predetermined minimum difference between the accumulated measures of wheel slip of axially associated sets of wheels to indicate the existence of a possible problem with at least one of the brakes associated with the set of axially associated wheels for which the least determined measure of wheel slip has been accumulated.

21. The system as defined by claim 20, wherein the vehicle includes an axial brake problem indicating device, the system further including means for actuating the axial brake problem indicating device in response to the axial brake problem signal.

22. The system as defined by claim 20, further including:

means for comparing the accumulated measures of wheel slip between wheels on a tractor and wheels on an associated trailer; and means for generating a tractor-trailer brake problem signal in response to a predetermined minimum difference between the accumulated measures of wheel slip between associated tractor and trailer wheels to indicate the existence of a possible problem with at least one of the brakes associated with the wheels on the tractor or trailer for which the least determined measure of wheel slip has been accumulated.

23. The system as defined by claim 22, wherein the vehicle includes a tractor-trailer brake problem indicating device, the system further including the step of actuating the tractor-trailer brake problem indicating device in response to the tractor-trailer brake problem signal.

* * * * *

UNITED STATES PATENT AND TRADEMARK OFFICE
CERTIFICATE OF CORRECTION

PATENT NO. : 5,390,120

DATED : February 14, 1995

INVENTOR(S) : CARON ET AL.

It is certified that error appears in the above-identified patent and that said Letters Patent is hereby corrected as shown below:

Column 3, Line 59

After "numeral" insert --10--.

Column 4, Line 17

Delete "slips" and insert --slip--.

Column 4, Line 18

Delete "w-heel speed" and insert
--w = wheel speed--.

Column 4, Line 19

Delete "I-wheel radius" and insert
--r = wheel radius --.

UNITED STATES PATENT AND TRADEMARK OFFICE
CERTIFICATE OF CORRECTION

PATENT NO. : 5,390,120
DATED : February 14, 1995
INVENTOR(S) : Caron et al

It is certified that error appears in the above-indentified patent and that said Letters Patent is hereby corrected as shown below:

Column 4, Line 20

Delete "v-hicle speed" and insert
-- v = vehicle speed--.

Signed and Sealed this

Sixteenth Day of May, 1995

Attest:

BRUCE LEHMAN

Attesting Officer

Commissioner of Patents and Trademarks